(12) United States Patent
Guo et al.

(10) Patent No.: US 6,222,392 B1
(45) Date of Patent: Apr. 24, 2001

(54) SIGNAL MONITORING CIRCUIT FOR DETECTING ASYNCHRONOUS CLOCK LOSS

(75) Inventors: Bin Guo; Dennis Lau, both of Fremont, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/232,711

(22) Filed: Jan. 19, 1999

Related U.S. Application Data

(60) Provisional application No. 60/082,183, filed on Apr. 17, 1998.

(51) Int. Cl.[7] .................................................... H03K 5/19
(52) U.S. Cl. .............................. 327/20; 327/198; 375/340
(58) Field of Search .................................. 327/141, 142, 327/161, 162, 18, 20, 198, 23–26, 218, 236; 375/357, 340

(56) References Cited

U.S. PATENT DOCUMENTS

| | | | |
|---|---|---|---|
| 4,316,284 | * 2/1982 | Howson | 370/512 |
| 4,887,071 | * 12/1989 | Virdee | 340/659 |
| 5,138,636 | * 8/1992 | Bardin | 375/357 |
| 5,264,745 | 11/1993 | Woo | 326/62 |
| 5,349,612 | 9/1994 | Guo et al. | 375/371 |
| 5,367,542 | 11/1994 | Guo | 375/359 |
| 5,400,370 | 3/1995 | Guo | 375/371 |
| 5,451,894 | 9/1995 | Guo | 327/241 |
| 5,457,719 | 10/1995 | Guo et al. | 375/373 |
| 5,561,390 | * 10/1996 | Hiiragizawa | 327/147 |

* cited by examiner

Primary Examiner—Timothy P. Callahan
Assistant Examiner—Minh Nguyen

(57) ABSTRACT

An apparatus detects the loss of an asynchronous input signal and generates a reset signal that is synchronous to a system clock signal. The apparatus detects the loss of the input signal and generates a first output signal. The first output signal is delayed by a predetermined number of clock cycles, and a second output signal is generated to indicate a sustained loss of the input signal. A signal monitoring circuit is provided to confirm the loss of the input signal and generate a third output signal. The reset signal is generated only if the signal loss is both sustained and confirmed. Accordingly, the apparatus will not be unnecessarily reset as a result of noise that delays or accelerates the arrival of an edge of the asynchronous input signal. The apparatus may also be configured to monitor the loss of multiple asynchronous input signals in a multi-port channel by cascading a plurality of sub-circuits, each of which is configured to receive at least one input signal and independently generate a local reset signal. Hence, the apparatus is capable of performing a graceful recovery if any of the input signals are lost.

17 Claims, 5 Drawing Sheets

PRIOR ART

SIGNAL MONITORING CIRCUIT FOR DETECTING ASYNCHRONOUS CLOCK LOSS

CROSS-REFERENCE TO RELATED APPLICATIONS

This application claims priority from provisional patent application Ser. No. 60/082,183, filed Apr. 17, 1998.

BACKGROUND OF THE INVENTION

1. Field of the Invention

The present invention relates to clock/data recovery systems and more particularly to a method and apparatus for applying digital techniques to recover clock and data from a serially transmitted data stream.

2. Description of the Related Art

Data transmission systems sometimes incorporate accurate and stable delay elements to generate predetermined width pulses for clock synchronization, clock multiplication, and clock/data recovery. In systems that serially transmit and receive data, clock information is generally embedded within the data stream to provide correct timing for data recovery because there are no separate lines or channels to independently carry the clock signal to the receiver. Clock frequency recovery and phase alignment with the data are typically performed before the received data can be recovered and deserialized.

Traditionally, a Phase Locked Loop (PLL) circuit is employed to recover the clock frequency and align the clock with the data phase. A PLL circuit incorporates a Voltage Controlled Oscillator (VCO) whose frequency is adjusted in response to the frequency of the incoming data. FIG. 5 illustrates the typical configuration of a PLL circuit. The PLL circuit includes a VCO 10 that outputs a phase signal $V_C$ to a phase detector 12. The phase detector 12 generates an error voltage ($V_E$) based on a comparison of the phase signal $V_C$ with a reference signal ($V_R$). After passing through a filter 14, the error voltage is supplied to the VCO 10. Accordingly, the phase difference must be constantly detected and so that the error voltage $V_E$ may be appropriately adjusted. The disadvantage of the circuit illustrated in FIG. 5 is that it is very sensitive. Any fluctuations from the outside coupled into the error voltage $V_E$ will influence the frequency F. The benefit of the circuit illustrated in FIG. 5 is that it is analog. Hence, regardless of the frequency or phase variations resulting from noise, the signal is never completely lost.

In operation, the PLL circuit detects the phase error of the recovered clock, or the phase difference between the output of the VCO 10 and the incoming data, and generates an error signal. The low pass filter 14 is used to filter and convert the error signal into a control voltage for driving the VCO 10 and consequently reducing the phase difference. Elimination, or leveling (i.e., obtaining a constant value), of the phase difference results in the VCO 10 outputting a retimed clock that has an established and known phase relationship with the data.

In practice, however, the incoming serial data is often contaminated with various types of noise that result in timing or phase jitter. Consequently, the edges (i.e., the transitions) in the data stream do not always arrive at precisely the same time. Rather, the edges arrive at different (either early or late) times, causing the timing noises (i.e., jitter). Additionally, incorrect phase errors are detected and adjustments to the VCO 10 control are still attempted even when the VCO frequency is the same as, or very close to, the data frequency.

PLL circuits are generally designed to reduce the effect of such jitter sources in the high frequency range by employing special low pass filters. However, such filtering introduces other problems. The control voltage to the VCO 10 is very susceptible to internally generated switching noise, and such susceptibility increases as the operating frequency increases. Furthermore, low pass filters employ large valued components such as capacitors and resistors, resulting in increased manufacturing costs when implemented as monolithic integrated circuits.

One approach to reducing the phase error of the recovered clock is to implement the PLL in a digital form. Such approaches typically employ an adjustable bias voltage, or current, to adjust the delay value of a delay unit in a ring oscillator in order to achieve frequency tuning (or to adjust the phase to match that) of the incoming data. Digital PLLs use digital logic for phase detection, filtering, and (at times) the ring oscillator. In a purely digital PLL system, no bias or ring oscillator is used. Such digital systems are disclosed in U.S. Pat. Nos. 5,457,719; 5,349,612; 5,400,370; 5,367,542; 5,451,894; and 5,264,745. However, digital implementations of PPLs must be specifically designed to accommodate particular data or coding formats, jitter tolerance, or operational frequencies.

In purely digital approaches to clock and data recovery, the phase offset information is stored in a digital format as a code. The code is stored and constantly updated in specially designed register circuits in order to reflect the phase difference as a function of time. Although digital clock/data recovery approaches are less sensitive to noise than analog PLLs under very noisy power supply conditions, they are subject to a "lock up" condition. Under a lock up condition, the system enters an undefined state wherein the stored information is either lost or "locked" and, consequently, unretrievable. This is because unlike analog PLL circuits, where there is always a bias voltage value (regardless of changes in the power supply voltage), a digital system is typically unable to perform a self-recovery lock-ups resulting from a power surge unless a full or partial reset operation is performed.

According to one approach to digital data recovery, various digital "pointers" are used to indicate the delay calibration status and the phase difference between the local clock and the remote clock which is used to send the data over the serial link. The pointers are constantly adjusted based on variations in temperature, supply voltage, and data phase and frequency. Compared to traditional synchronous digital circuits, these adjustment operations are further complicated by the fact that they relate to two asynchronous clock sources. When a power supply surge occurs, there is a possibility that one of the "pointers" can get lost, and subsequently, the recovered clock signal gets lost. User software "watch dog" functions have previously been used to ensure the reliability and automatic recovery from unexpected events. However, in an integrated chip or system, software monitored by the user can only do a system-wide or chip-wide reset. Therefore, a non-graceful recovery process results.

Accordingly, a primary disadvantage associated with current methods of recovering asynchronous signals, such as a clock signal, and data from a serially transmitted data stream is the inability to perform a graceful recovery upon detecting a loss of the clock signal.

DISCLOSURE OF THE INVENTION

There is a need for an arrangement for recovering signals and data asynchronously within a serially transmitted data stream, and performing a graceful recovery upon detecting a loss of the signals.

These and other needs are addressed by the present invention, wherein an internal signal is generated based on the detection of a loss of the asynchronous input signal and execute an automatic reset of a data recovery function without user input.

In accordance with one aspect of the invention, an apparatus for detecting the loss of an asynchronous input signal comprises a frequency division circuit, a detection circuit, and an output circuit. The frequency division circuit receives the input signal and outputs a toggle signal that has a lower frequency than the input signal. The detection circuit receives the toggle signal and a system clock signal that is asynchronous to the input signal. The detection circuit outputs two output signals. The first output signal indicates a temporary loss of the input signal, while the second output signal indicates a sustained loss of the input signal over a predetermined length of time. The output circuit outputs a reset signal based on the loss of the first output signal and synchronous with the system clock signal. The present apparatus can effectively detect the presence of an asynchronous signal, and execute an automatic reset of a data recovery function upon confirmation of a loss of the asynchronous signal. Hence, a graceful recovery can be performed without user assistance.

According to one embodiment of the invention, a signal monitoring circuit receives the input signal and the first output signal, and outputs a third output signal that indicates a confirmed loss of the input signal. The output circuit receives the third output signal and generates the reset signal only if a loss of the input signal is both detected and confirmed.

In accordance with another aspect of the invention, an apparatus is provided for asynchronously detecting the loss of any of a plurality of input signals. The apparatus includes a plurality of sub-circuits, each of which includes circuitry for receiving at least one of the plurality of input signals, and a system clock signal. Each sub-circuit detects and confirms the loss of the input signal which it receives. Upon confirming the loss of its input signal, the sub-circuit outputs a local reset signal indicative of the loss of the input signal which it received. The local reset signal output by each sub-circuit is also synchronous to the system clock signal. An output circuit is provided to receive the local reset signals output by the plurality of sub-circuits and output a global reset signal to reset the apparatus if any of the sub-circuits has detected a loss of any of the input signals which it receives. Hence, multiple sub-circuits may be cascaded to monitor individual input signals to a multiport channel, and a graceful recovery may be performed if any of the input signals are lost.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENT

Figure 1:
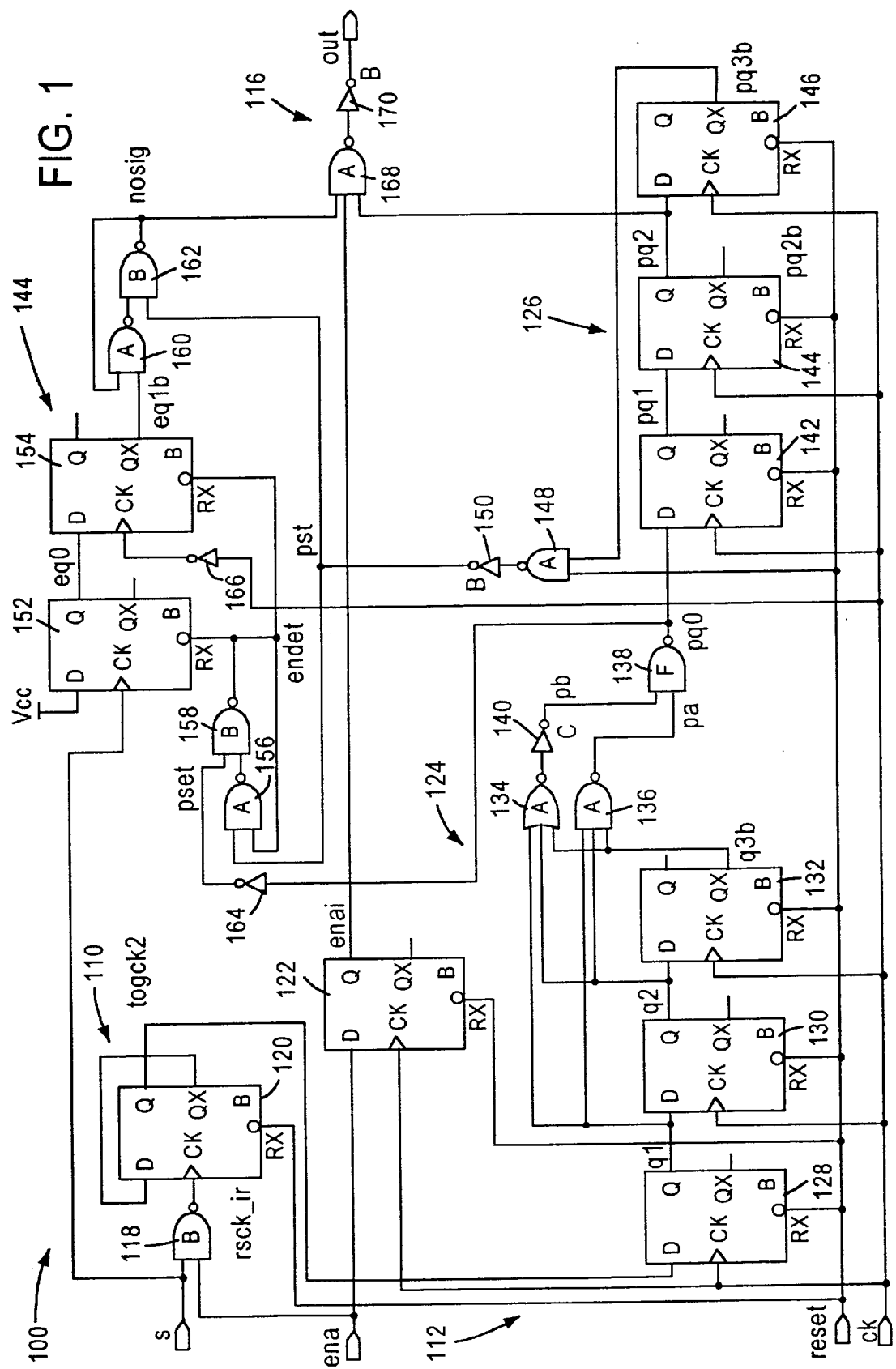
FIG. 1 is a circuit diagram illustrating an exemplary circuit for detecting a signal loss according to an embodiment of the present invention.

FIG. 1 illustrates a circuit 100 for monitoring and detecting the loss of an asynchronous input signal according to an embodiment of the present invention. The circuit 100 includes a frequency division circuit 110, a detection circuit 112, a signal monitoring circuit 114, and an output circuit 116. The circuit 100 of FIG. 1 receives an input signal (S) that is to be monitored. The input signal, which may be a clock signal or a data signal transmitted via a network medium, is received at a frequency that is asynchronous to an internal system clock signal (CK) with the same frequency.

The frequency division circuit 110 includes a NAND gate 118 and a D-type flip-flop 120 having a reset input. The NAND gate 118 receives the input signal (S) and a second input signal (ENA) that functions to enable the circuit 100, and can be de-asserted under certain situations where a signal loss may be improperly detected by the circuit 100 (e.g., initial power up calibration). The second input signal (ENA) is also supplied to a shift register 122 that delays the ENA signal by a full system clock cycle. D-type flip-flop 120 receives the output of NAND gate 118 and generates a toggle signal (TOGCK2) that indicates whether the input signal (S) is present (i.e., toggling). According to the disclosed embodiment, the toggle signal (TOGCK2) generated by the frequency division circuit 110 has a frequency which is one half the frequency of the input signal (S).

The detection circuit 112 includes a shift circuit 124 and a delay circuit 126. The toggle signal (TOGCK2) generated by the frequency division circuit 110 is input to the shift circuit 124 of the detection circuit 112. In addition, the detection circuit 112 receives the system clock signal (to both the shift circuit 124 and the delay circuit 126) that is internally generated by a local clock and asynchronous to the input signal. The shift circuit 124 includes three shift registers (128, 130, 132) having respective outputs that are arranged to form a serial-in parallel-out output value for the circuit 124, and a plurality of logic gates (134, 136, 138). The output of shift register 128 (Q1) is directed to the inputs of shift register 130, NOR gate 134, and NAND gate 136. The output of shift register 130 (Q2) is directed to the inputs of shift register 132, NOR gate 134, and NAND gate 136. In contrast to shift registers 128 and 130, the inverted output of shift register 132 (Q3b) is directed to the inputs of NOR gate 134 and NAND gate 136. Hence, shift circuit 124 generates the serial-in parallel-out output value (Q1, Q2, Q3b) for gates 134 and 136. The output of NOR gate 134 is passed through an inverter 140, which outputs a signal (PB) to NAND gate 138, while the output of NAND gate 136 (PA) is input to NAND gate 138. NAND gate 138 outputs a first output signal (PQØ) that indicates a temporary loss of the input signal (S) based on signals output from NAND gate 136 and inverter 140 (PA and PB), described below with reference to FIGS. 2 and 3.

The first output signal (PQØ) is input to both the delay circuit 126 and the signal monitoring circuit 114. The delay circuit 126 includes a plurality of shift registers (142, 144, 146), and is designed to delay the first output signal (PQØ) by a predetermined number of clock cycles before generating a second output signal (PQ2) that indicates a sustained loss of the toggle signal (TOGCK2) over a predetermined length of time. A shift register 142 receives the first output signal (PQØ) and outputs a signal (PQ1) that is input to shift register 144. Shift register 144 outputs the second output signal (PQ2) which is input to both shift register 146 and the output circuit 116. The inverted output of shift register 146 (PQ3b) is input to NAND gate 148. The output of NAND gate 148 is passed through inverter 150 whose output (PST) is directed to the signal monitoring circuit 114.

The signal monitoring circuit 114 includes a plurality of shift registers (152, 154) and logic gates (156, 158, 160, 162), and is used to verify that the input signal (S) has truly been lost, as described below. The output of inverter 150 (PST) is input to NAND gate 156 and NAND gate 162 of the signal monitoring circuit 114. The first output signal (PQØ) from the shift circuit 124 is passed through inverter 164, whose output (PSET) is directed to NAND gate 158. The output of NAND gate 156 is input to NAND gate 158, while the output of NAND gate 158 (ENDET) is fed back to NAND gate 156. The output of NAND gate 158 (END) is also used to reset shift registers 152 and 154.

Shift register 152 operates on (i.e., is clocked by) the frequency of the input signal (S), and receives high voltage potential signal (Vcc). The output of shift register 152 (EQØ) is input to shift register 154, which operates on the frequency of the system clock signal (CK). Prior to input to shift register 154, however, the system clock signal (CK) is passed through inverter 166. The inverted output of shift register 154 (EQ1b) is input to NAND gate 160. NAND gate 162 receives the output of NAND 160 and outputs a third output signal (NOSIG) that is fed back to NAND gate 160 and input to the output circuit 116.

The output circuit 116 includes NAND gate 168 and inverter 170. NAND gate 168 receives the second output signal (PQ2), the third output signal (NOSIG), and the second input signal (delayed by shift register 122), and outputs a reset signal (OUT). As previously stated, the second input signal (ENA) is used to mask the second output signal (PQ2) and prevent the output circuit 116 from outputting an unnecessary reset signal (OUT) during situations, such as power up calibration or other transient conditions, where a false signal loss may be detected. The reset signal (OUT) output by the output circuit 116 is also synchronous to the system clock signal (CK).

In operation, the input signal (S) received by the circuit 100 typically corresponds to a clock signal that is recovered from a serially received data stream from an external source, and asynchronous to the system clock signal (CK). Because it is asynchronous to the system clock signal, the relative phase of the input signal (with respect to the system clock signal) is continuously shifted because of the frequency offset. Consequently, the edges of the input signal (S) will not always have a fixed phase relationship with the edges of the system clock signal (CK), and a direct comparison of the two signals will often indicate a constant shifting effect. In addition, the input signal (S) will often contain distortions that make it difficult for the circuit 100 to detect the input signal (S).

Figure 2:
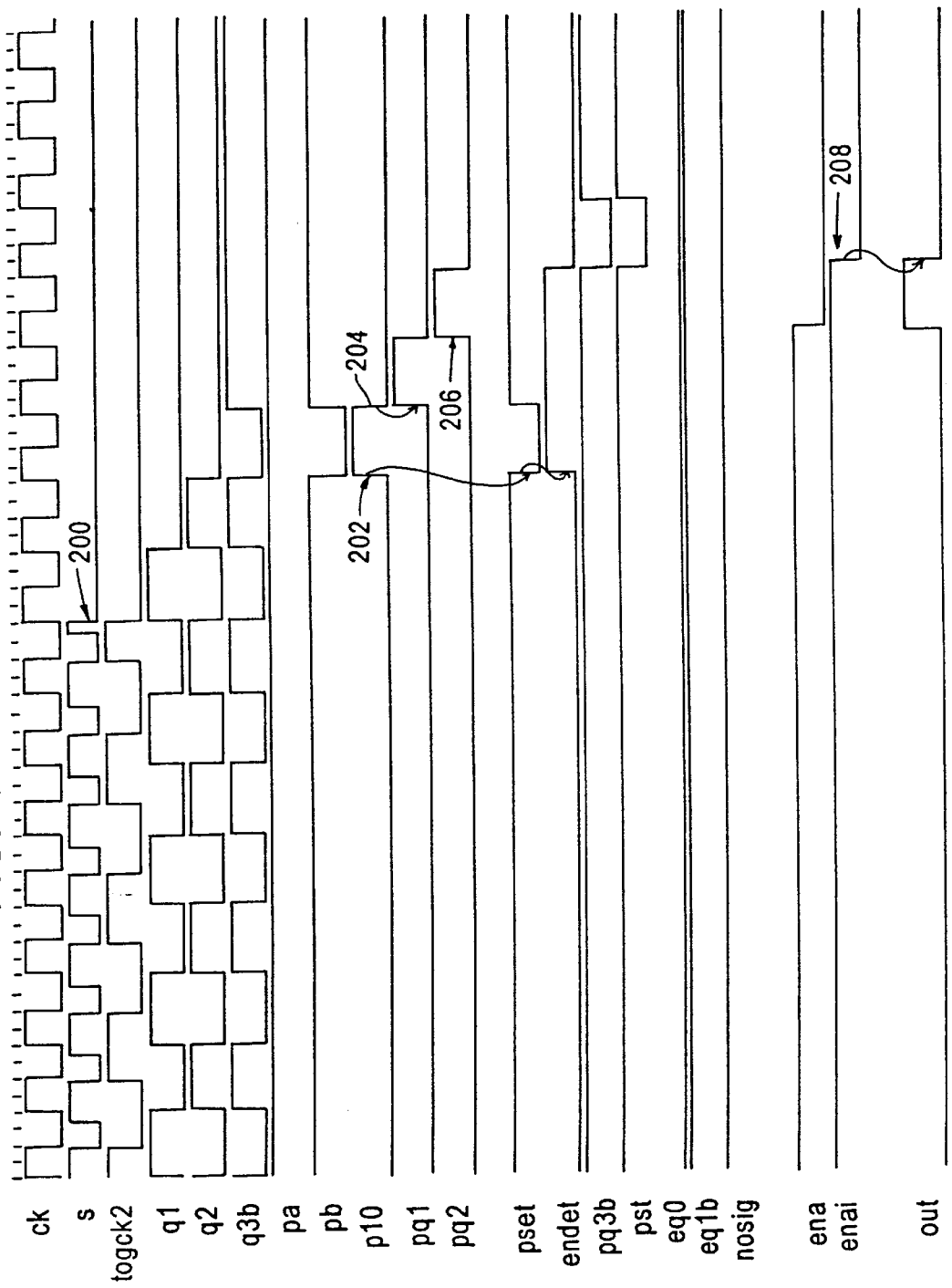
FIG. 2 is a timing diagram illustrating detection of a signal loss according to an embodiment of the present invention.

Referring additionally to FIG. 2, the toggle signal (TOGCK2) generated by the frequency division circuit 110 is one half the frequency of the input signal (S). Shift register 128 uses the system clock signal (CK) in order to detect the presence of the input signal (S). This is accomplished by detecting a change in the state of the toggle signal (TOGCK2). For example, if the input signal (S) is present, then at every cycle of the system clock signal (CK), the value of the toggle signal (TOGCK2) will change.

After an initial reset of the system, shift registers 128, 130, and 132 will normally output the bit pattern [0 0 0]. However, because the inverted output of shift register 132 is read, the bit pattern sent to NOR gate 134 is actually [0 0 1]. During normal operation (i.e., when the input signal is present), the state of the toggle signal (TOGCK2) will always be changing. Hence, shift register 128 will always detect alternating 0s and 1s, and output an alternating bit pattern [0 1 0 1 0 . . . ]. If shift register 128 detects two consecutive 0s or 1s, then it is possible that the input signal (S) has been lost. Shift registers 130 and 132 are used to propagate the toggle signal (TOGCK2) for two additional system clock cycles so that NOR gate 134 registers a loss of the input signal (S). NAND gate 138 generates the first output signal (PQØ) two cycles later to indicate a temporary loss of the input signal (S).

As illustrated in FIG. 2, shift register 128 detects the toggle signal (TOGCK2) clocked by the system clock signal (CK), and outputs a signal (Q1) having the same frequency as the toggle signal (TOGCK2), but with a phase lag. Shift register 130 outputs a signal (Q2) that is identical to the signal (Q1) output by shift register 128, but delayed by one system clock cycle. The output generated by shift register 132 (Q3b) is also a shifted copy of the output (Q2) of shift register 130.

At event 200, the input signal (S) is lost. Shift register 128 detects the loss of the input signal (S) at the rising edge of the following clock cycle. At event 202 shift registers 130 and 132 both detect a loss of the input signal (S) and cause NAND gate 138 to output the first output signal PQØ (i.e., become asserted) for one clock cycle. The first output signal (PQØ) is inverted and input to NAND gate 158, causing the output of NAND gate 158 (ENDET) to become asserted. The first output signal (PQØ) propagates to shift registers 142 and 144 at events 204 and 206, respectively. The third output signal (NOSIG) remains asserted throughout events 200–206. Consequently, the reset signal (OUT) output by inverter 170 becomes asserted at event 206. The reset signal (OUT) is also synchronous with the system clock signal (CK). According to the disclosed embodiment, if the input signal (S) is detected within two clock cycles, then normal operation of the system resumes without generating the first output signal (PQØ). Accordingly, the circuit continues to operate in a normal manner without generating an unnecessary reset.

Assertion of the second output signal (PQ2) enables the reset signal (OUT) at event 206. However, the second input signal (ENA) is delayed by one system clock cycle at shift register 122 and does not arrive at NAND gate 168 until event 208. Therefore, the reset signal (OUT) output by inverter 170 remains asserted for an additional clock cycle (i.e., as the ENAI signal). At event 208, NAND gate 168 detects deassertion of the second input signal (which was delayed by shift register 122), and causes the reset signal (OUT) to become deasserted.

According to the disclosed embodiment of the invention, assertion of the first output signal (PQØ) indicates one of two possible effects. The possible effects are that (1) the input signal (S) is truly lost, or (2) the input signal (S) was either temporarily lost or the first output signal (PQØ) was generated because of noise and/or distortion. FIG. 2 illustrates the situation where the input signal (S) is truly lost and a reset signal (OUT) is generated.

Figure 3:
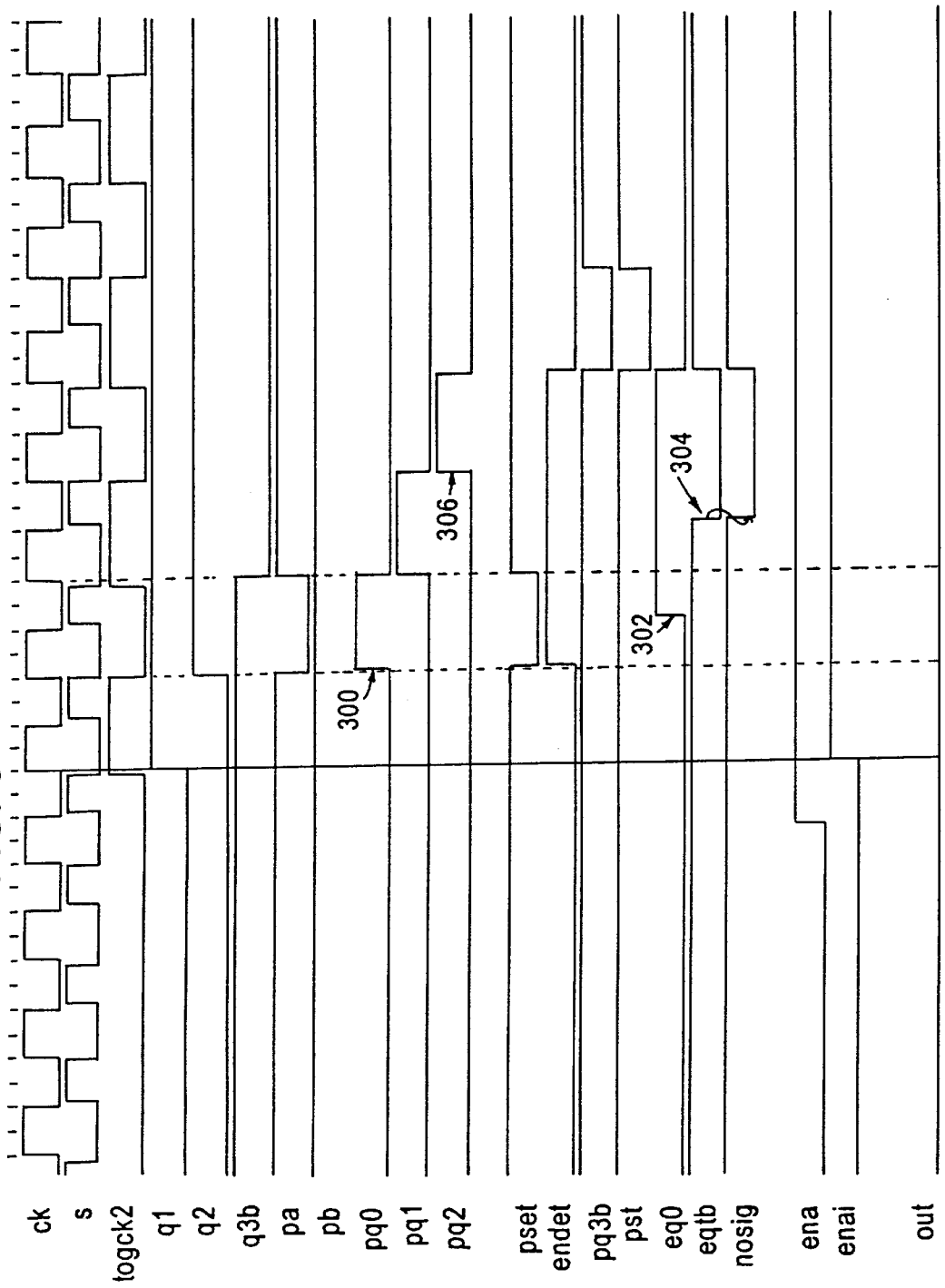
FIG. 3 is a timing diagram illustrating a detection of a false signal loss.

FIG. 3 is a timing diagram illustrating detection of a false input signal loss. The input signal (S) contains distortion or jitter that creates edge displacement in the input signal (S). When the frequency division circuit 110 generates and outputs the toggle signal (TOGCK2), shift register 128 does not detect a change in state, but rather always detects a high value for the toggle signal (TOGCK2). As a result, two consecutive 1s are detected and propagated through shift registers 130 and 132. Consequently, NAND gate 138 generates a false first output signal (PQØ) at event 300, since the input signal (S) is present and the toggle signal (TOGCK2) is changing states. The first output signal (PQØ) also causes the output of NAND gate 158 (ENDET) to become asserted.

Assertion of the ENDET signal from NAND gate 158 releases shift register 152 from holding a value of "0". If the ENDET signal is asserted, then at event 302 (the rising edge of the input signal), the output of shift register 152 (EQØ) will become asserted. The change in state of shift register 152 will propagate to shift register 154 one and one half (1½) system clock cycles later, causing the output of shift register 154 (EQ1b) to become deasserted at event 304. In response to the output of shift register 154 (EQ 1b) being deasserted, NAND gate 162 generates the third output signal (i.e., NOSIG is deasserted).

As illustrated in FIG 3, the output of NAND gate 162 (NOSIG) is asserted 1½ clock cycles after the first output signal (PQØ)is generated. However, it takes 2 clock cycles to propagate the first output signal (PQØ) to shift register 144 in order to generate the second output signal (PQ2). Additionally, the output of shift register 152 (EQØ) remains asserted until the output of shift register 146 (PQ3b) becomes deasserted so the output of NAND gate 162 (NOSIG) can remain deasserted. Consequently, a reset signal (OUT) is not generated at event 306 when the second output (PQØ) signal arrives at NAND gate 168, because the third output signal (NOSIG) is deasserted. When the output of shift register 146 (PQ3b) is deasserted, the output of gate 162 (NOSIG) is again asserted. However, the second output signal (PQ2) remains asserted for only one clock cycle, and is then deasserted. Therefore, NAND gate 168 is prevented from generating the reset signal (OUT), and the circuit will not be reset.

Figure 4:
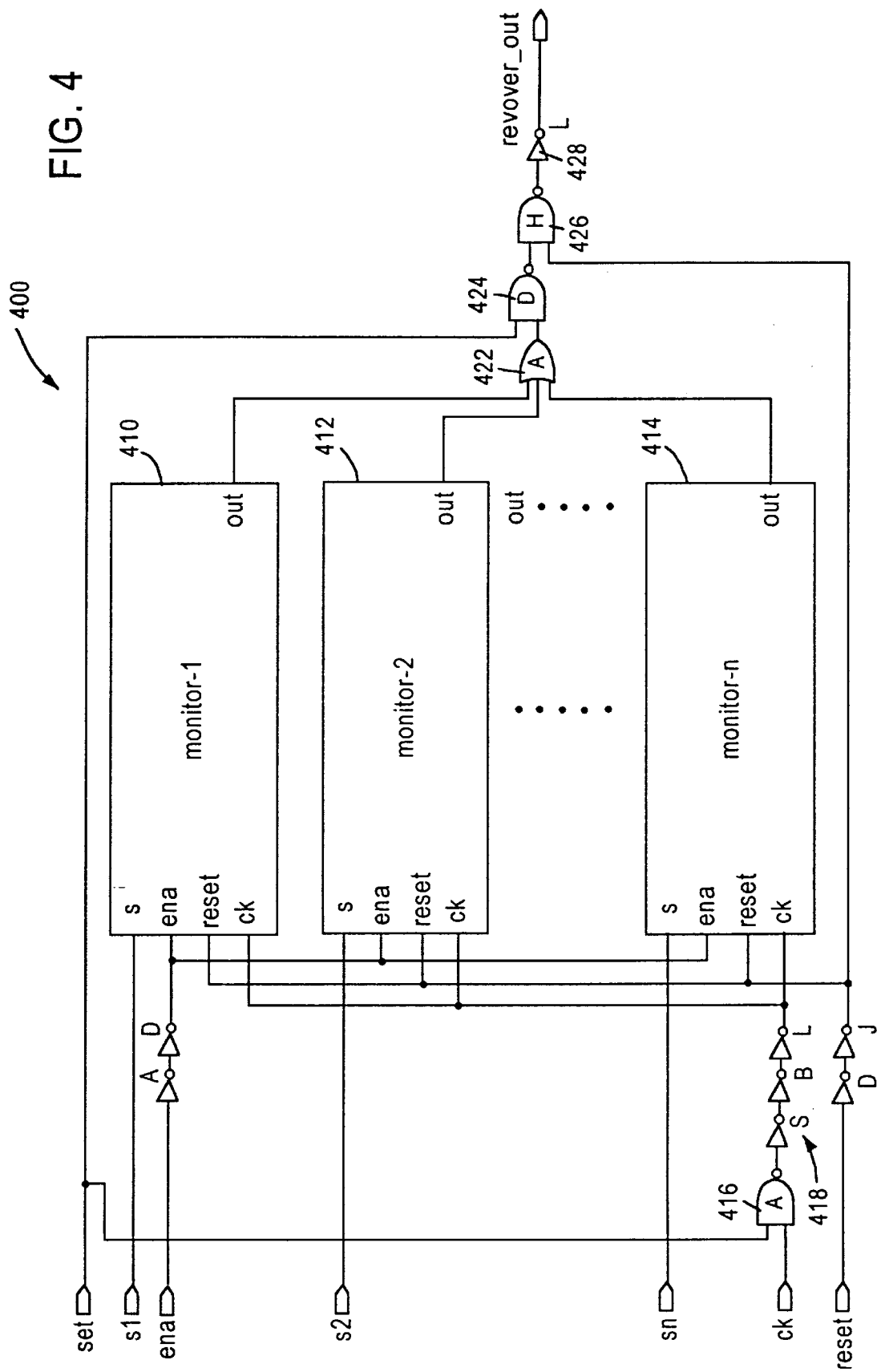
FIG. 4 is a circuit diagram illustrating monitoring of multi-port channels according to an embodiment of the present invention.
Figure 5:
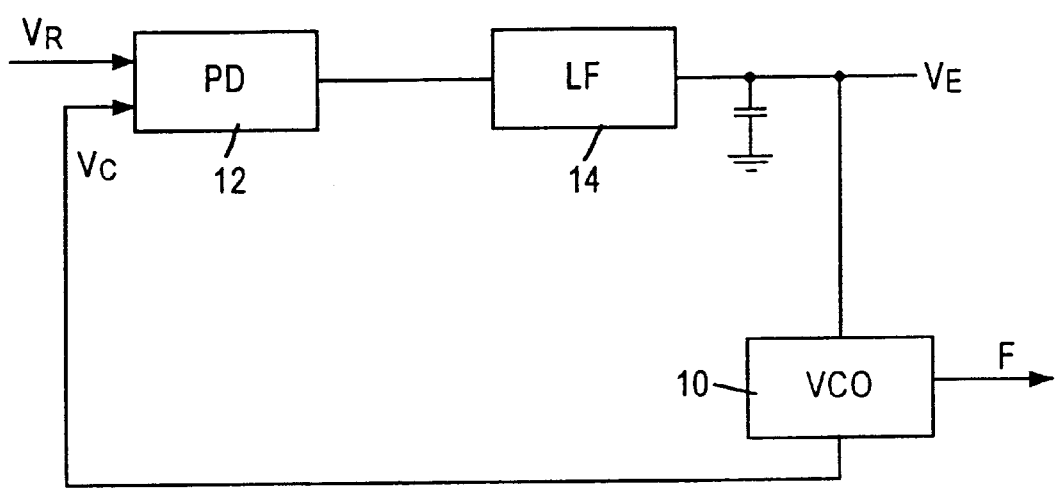
FIG. 5 is a circuit diagram illustrating the configuration of a conventional Phase Locked Loop circuit.

FIG. 4 illustrates a circuit 400 for monitoring multi-port channels according to another embodiment of the invention. The circuit 400 includes multiple monitoring sub-circuits 410, 412, 414, etc., that correspond to the number of channels to be monitored. Each sub-circuit 410–414 is functionally and structurally similar to the circuit 100 described with reference to FIG. 1. Each sub-circuit 410–414 receives an input signal (S1–Sn) that is asynchronous to a system clock signal (CK). As illustrated in FIG. 4, each sub-circuit may receive an input signal independently of the other sub-circuits.

A second input signal (ENA) is supplied to each of the sub-circuits 410–414. Depending on the specific implementation, the second input signal (ENA) may be buffered by a pair of inverters 420, although this is not required. The system clock signal (CK) and a third input signal (SET) are supplied to NAND gate 416 and optionally buffered by a plurality of inverters 418 prior to being supplied to the sub-circuits 410–414. According to the embodiment illustrated in FIG. 4, each sub-circuit 410–414 independently monitors the respective input signal (S1–Sn) which it receives, and generates a local reset signal (OUT) if a loss of the input signal (S1–Sn) is detected and confirmed. The local reset signals are input to OR gate 422. NAND gate 424 receives the output of OR gate 422 and the third input signal (SET). The output of NAND gate 424 and a fourth input signal (RESET) are input to NAND gate 426. NAND gate 426 generates an output signal that is passed through inverter 428 in order to correspond to a system reset signal (REVOVER_OUT) that is synchronous with the system clock signal (CK).

The present invention advantageously allows a graceful (i.e., class 4) recovery from the loss of an asynchronous input signal. Rather than implementing complex circuitry to detect proper timing of the asynchronous input signal, a toggle signal is generated based on the asynchronous input signal. A loss of the toggle signal will therefore correspond to a loss of the asynchronous signal. According to the present invention, a graceful recovery can be performed without input from the user and without the need to reset the entire system. Additionally, the present invention allows cascading of multiple sub-circuits in order to monitor each individual input signals to a multi-port channel. A graceful recovery can then be performed if any of the input signals are lost. Furthermore, the present invention may be configured to confirm the loss of the asynchronous signal so that the circuit will not be unnecessarily reset as a result of noise, such as jitter, that delays or accelerates the arrival of an edge of the asynchronous input signal.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. Apparatus for detecting the loss of an asynchronous input signal and generating a reset signal, the apparatus comprising:

a frequency division circuit for receiving the input signal and in response outputting a toggle signal having a lower frequency than the input signal;

a detection circuit for outputting a first output signal and a second output signal based on said toggle signal and a system clock signal which is asynchronous to said input signal, said first output signal being indicative of a loss of said input signal for a first time period, and said second output signal, different than said first output signal, being indicative of a loss of said input signal for a second time period longer than said first time period; and an output circuit for outputting said reset signal for resetting said apparatus only if a loss of said input signal extends for a Period of time at least as long as said second time period as indicated by outputting of said second output signal, wherein said reset signal is output synchronous with said system clock signal.

2. The apparatus of claim 1, wherein said detection circuit includes:

a shift circuit for detecting the presence of a predetermined bit pattern based on said toggle signal; and a delay circuit for receiving said first output signal and outputting said second output signal.

3. The apparatus of claim 2, wherein said shift circuit includes a plurality of shift registers having outputs arranged to form a serial-in parallel-out output value for said shift circuit based on values of said toggle signal, and a plurality of logic gates for receiving the outputs of said plurality of shift registers and detecting the presence of said predetermined bit pattern.

4. The apparatus of claim 1, wherein a second input signal is input to said output circuit for selectively masking said second output signal and preventing said output circuit from outputting said reset signal.

5. The apparatus of claim 1, further comprising a signal monitoring circuit for receiving said input signal and said first output signal, and outputting a third output signal indicative of a confirmed loss of said input signal.

6. The apparatus of claim 5, wherein said signal monitoring circuit includes a plurality of shift registers and a plurality of logic gates for detecting a prescribed bit pattern from the outputs of said plurality of shift registers.

7. The apparatus of claim 6, wherein said prescribed bit pattern comprises two consecutive bit values that are identical.

8. A method of detecting the loss of an asynchronous input signal received by an apparatus having a system clock signal comprising the steps:

generating a toggle signal based on said input signal, said toggle signal having a lower frequency than said input signal;

generating a first output signal, based on said toggle signal, that is indicative of a loss of said input signal for a first time period;

generating a second output signal, different from and based on said first output signal, that is indicative of a loss of said input signal for a second time period different from and greater than said first time period; and generating a reset signal for resetting said apparatus only if a loss of said input signal extends for a period of time at least as long as said second time period as indicated by generation of said second output signal, wherein said reset signal is generated synchronous with said system clock signal.

9. The method of claim 8, wherein the step of generating a first output signal further includes the steps:

sequentially shifting detected values of said toggle signal through a plurality of shift registers based on said system clock signal; and monitoring the outputs of said plurality of shift registers to detect the presence of a prescribed bit pattern.

10. The method of claim 9, wherein the step of monitoring includes monitoring the outputs of said plurality of shift registers for the presence of two consecutive bit values that are identical.

11. The method of claim 8, wherein the step of generating a second output signal further includes a step of delaying said first output signal by a predetermined number of system clock cycles.

12. The method of claim 11, wherein the step of delaying includes the step of delaying said first output signal by two system clock cycles.

13. The method of claim 8, further comprising a step of generating a third output signal, based on said first output signal and said input signal, that is indicative of a confirmed loss of said input signal.

14. The method of claim 13, wherein the step of generating a reset signal comprises the step of generating said reset signal based upon detection of predetermined values for said second output signal and said third output signal.

15. The method of claim 14, wherein the step of generating the reset signal comprises generating said reset signal if said second output signal and said third output signal indicate that said input signal has been lost.

16. The method of claim 14, further comprising a step of suppressing output of said reset signal if said second output signal and said third output signal indicate that said input signal has been temporarily lost and subsequently recovered.

17. The method of claim 13, further comprising the step of supplying a second input signal for selectively masking said second output signal, the step of generating a reset signal further including the step of generating a reset signal based upon detection of said second output signal, said third output signal, and said second input signal.

* * * * *